(12) United States Patent
Janky et al.

(10) Patent No.: US 10,165,255 B2
(45) Date of Patent: *Dec. 25, 2018

(54) INDOOR NAVIGATION VIA MULTI-BEAM LASER PROJECTION

(71) Applicant: Trimble Inc., Sunnyvale, CA (US)

(72) Inventors: James M. Janky, Los Altos, CA (US); Kevin A. I. Sharp, Picton (NZ); Michael V. McCusker, Los Altos, CA (US); Morrison Ulman, Los Altos, CA (US)

(73) Assignee: Trimble Inc., Sunnyvale, CA (US)

( * ) Notice: Subject to any disclaimer, the term of this patent is extended or adjusted under 35 U.S.C. 154(b) by 844 days.

This patent is subject to a terminal disclaimer.

(21) Appl. No.: 13/922,530

(22) Filed: Jun. 20, 2013

(65) Prior Publication Data
US 2014/0285631 A1 Sep. 25, 2014

Related U.S. Application Data

(63) Continuation-in-part of application No. 13/847,585, filed on Mar. 20, 2013.

(51) Int. Cl.
| | |
|---|---|
| *G01C 15/00* | (2006.01) |
| *G01C 11/00* | (2006.01) |
| *H04N 13/239* | (2018.01) |
| *G01C 21/20* | (2006.01) |
| *G01S 5/16* | (2006.01) |
| *G05D 1/02* | (2006.01) |

(Continued)

(52) U.S. Cl.
CPC ......... *H04N 13/239* (2018.05); *G01C 21/206* (2013.01); *G01S 5/16* (2013.01); *G05D 1/0248* (2013.01); *G06T 7/596* (2017.01); *G06T 7/97* (2017.01); *G05D 2201/0216* (2013.01)

(58) Field of Classification Search
CPC ..................................................... G01C 21/206
See application file for complete search history.

(56) References Cited

U.S. PATENT DOCUMENTS

| | | | |
|---|---|---|---|
| 4,796,198 A | 1/1989 | Boultinghouse | |
| 5,137,354 A | 8/1992 | deVos | |

(Continued)

FOREIGN PATENT DOCUMENTS

| | | |
|---|---|---|
| DE | 69019767 T2 | 2/1996 |
| EP | 0221643 A2 | 5/1987 |

(Continued)

OTHER PUBLICATIONS

Haralick et al., "Review and Analysis of Solutions of the Three Point Perspective Pose Estimation Problem", International Journal of Computer Vision, 13, 3, 331-356 (1994), Kluwer Academic, The Netherlands.

(Continued)

*Primary Examiner* — Jorge L Ortiz Criado
*Assistant Examiner* — Kyle Lotfi
(74) *Attorney, Agent, or Firm* — Kilpatrick Townsend & Stockton LLP

(57) ABSTRACT

An indoor navigation system is based on a multi-beam laser projector, a set of calibrated cameras, and a processor that uses knowledge of the projector design and data on laser spot locations observed by the cameras to solve the space resection problem to find the location and orientation of the projector.

33 Claims, 15 Drawing Sheets

(51) Int. Cl.
*G06T 7/00* (2017.01)
*G06T 7/593* (2017.01)

(56) References Cited

U.S. PATENT DOCUMENTS

| | | | |
|---|---|---|---|
| 5,255,195 | A | 10/1993 | Mochizuki |
| 6,064,940 | A | 5/2000 | Rodgers |
| 7,305,277 | B2 | 12/2007 | Freeman |
| 7,720,554 | B2 | 5/2010 | DiBernardo |
| 7,774,083 | B2 | 8/2010 | Freeman |
| 7,899,618 | B2 | 3/2011 | Ledet |
| 8,224,030 | B2 | 7/2012 | Otani |
| 2001/0020127 | A1* | 9/2001 | Oshio .............. A61B 90/36 600/429 |
| 2003/0208302 | A1 | 11/2003 | Lemelson |
| 2004/0001197 | A1 | 1/2004 | Ko |
| 2005/0211882 | A1* | 9/2005 | Ohtomo .............. G01C 15/002 250/221 |
| 2008/0204699 | A1 | 8/2008 | Benz |
| 2009/0278030 | A1* | 11/2009 | Deliwala .............. A63F 13/06 250/206.2 |
| 2011/0260033 | A1* | 10/2011 | Steffensen .......... G01C 15/002 250/203.1 |
| 2011/0299059 | A1 | 12/2011 | Buettgen et al. |
| 2012/0050528 | A1* | 3/2012 | Davies .............. G01C 11/02 348/136 |
| 2012/0148145 | A1* | 6/2012 | Liu .............. G06T 7/0075 382/154 |
| 2012/0262365 | A1* | 10/2012 | Mallinson .......... G01S 1/725 345/156 |
| 2013/0138246 | A1 | 5/2013 | Gutmann et al. |
| 2014/0098379 | A1* | 4/2014 | Smits .............. G01B 11/14 356/614 |

FOREIGN PATENT DOCUMENTS

| | | |
|---|---|---|
| JP | 2008-204196 A | 9/2008 |
| JP | 2008204196 A * | 9/2008 |
| WO | 2012041687 A1 | 4/2012 |

OTHER PUBLICATIONS

Schonemann, "A Generalized Solution of the Orthogonal Procrustes Problem", Psychometrika, 31, 1, 1-10 (1966), Springer, New York.
Grafarend et al., "Closed-form solution of P4P or the three-dimensional resection problem in terms of Mobius barycentric coordinates", Journal of Geodesy, 71, 217-231 (1997), Springer-Verlag, New York.
Ma et al., An Invitation to 3-D Vision, Chapter 5, 109-170 (2003), Springer, New York.
Martin Habbecke et al., "LaserBrush: A Flexible Device for 3D Reconstruction of Indoor Scenes", ACM Symposium on Solid and Physical Modeling, 2008.
Sebastian Tilch et al., "CLIPS Proceedings", International Conference on Indoor Positioning and Indoor Navigation, Guimarães, Portugal, Sep. 21, 2011.
Rainer Mautz et al., "Survey of Optical Indoor Positioning Systems", International Conference on Indoor Positioning and Indoor Navigation, Guimarães, Portugal, Sep. 21, 2011.
Sebastian Tilch et al "Current investigations at the ETH Zurich in optical indoor positioning" WPNC 2010 IEEE.
International Preliminary Report on Patentability in PCT/US2014/031269.
International Search Report and Written Opinion of the International Searching Authority in PCT/US2014/031270, dated Jul. 10, 2014.
Scharstein, D., "High-Accuracy Stereo Depth Maps Using Structured Light," Proceedings of the 2003 IEEE Computer Society Conference on Computer Vision and Pattern Recognition (CVPR '03), 2003, 8 pages.
International Preliminary Report on Patentability for Application No. PCT/US2014/031270, dated Sep. 22, 2015, 6 pages.
Non-Final Office Action for U.S. Appl. No. 13/922,530, dated Feb. 3, 2016, 16 pages.
Non-Final Office Action for U.S. Appl. No. 13/922,530, dated May 25, 2016, 15 pages.
Final Office Action for U.S. Appl. No. 13/922,530, dated Nov. 23, 2016, 16 pages.
U.S. Appl. No. 13/847,585, Non-Final Office Action dated Apr. 21, 2017, 13 pages.
Non-Final Office Action for U.S. Appl. No. 13/847,585, dated Feb. 3, 2016, 16 pages.
Non-Final Office Action for U.S. Appl. No. 13/847,585, dated May 25, 2016, 15 pages.
Final Office Action for U.S. Appl. No. 13/847,585, dated Nov. 23, 2016, 16 pages.
U.S. Appl. No. 13/847,585, Advisory Action dated Mar. 1, 2017, 7 pages.
U.S. Appl. No. 13/847,585 Non-Final Office Action dated Jun. 11, 2018, 16 pages.
Boochs, F. et al., "Increasing the accuracy of untaught robot positions by means of a multi-camera system," 2010 International Conference on Indoor Positioning and Indoor Navigation (IPIN), Sep. 15-17, 2010, Zürich, Switzerland, (Year: 2011), 9 pages.
U.S. Appl. No. 13/847,585 Final Office Action dated Oct. 11, 2017, 13 pages.

* cited by examiner

INDOOR NAVIGATION VIA MULTI-BEAM LASER PROJECTION

RELATED APPLICATIONS

This application is a continuation-in-part of U.S. Ser. No. 13/847,585 filed on Mar. 20, 2013 and incorporated herein by reference.

TECHNICAL FIELD

The disclosure is generally related to indoor navigation.

BACKGROUND

Conventional indoor navigation techniques include ultrasonic or laser ranging, tracking marked objects with cameras, and interpreting video scenes as captured by a camera. This last method, navigating as a person would by interpreting his visual surroundings, is an outstanding problem in computer vision research.

A variety of challenges are associated with these and other indoor navigation techniques. Occlusion, for example, occurs when a camera or detector's view is blocked. Lack of sensitivity can be an issue when object-tracking cameras are located too close to one another, leading to small angle measurements. Some vision-based navigation systems depend on surface texture which may not always be available in an image. Finally, incremental positioning methods may accumulate errors which degrade positioning accuracy.

Building construction is one scenario in which indoor navigation is a valuable capability. Robots that lay out construction plans or install fixtures need accurate position and orientation information to do their jobs. Assembly of large aircraft parts offers another example. Precisely mating airplane fuselage or wing sections is helped by keeping track of the position and orientation of each component. In scenarios like these, as a practical matter, it is helpful for indoor navigation solutions to be expressed in the same coordinates as locations of building structures such as walls, floors, ceilings, doorways and the like.

Many vision-based indoor navigation systems cannot run in real time because the computational requirements are too great. Finally, a navigation system for a small robot is impractical if it consumes too much power or weighs or costs too much. What is needed is an indoor navigation system that permits accurate tracking of the location and orientation of objects in an indoor space while overcoming the challenges mentioned above and without requiring excessive computational capacity, electrical power or weight.

DETAILED DESCRIPTION

Introduction

Figure 1:
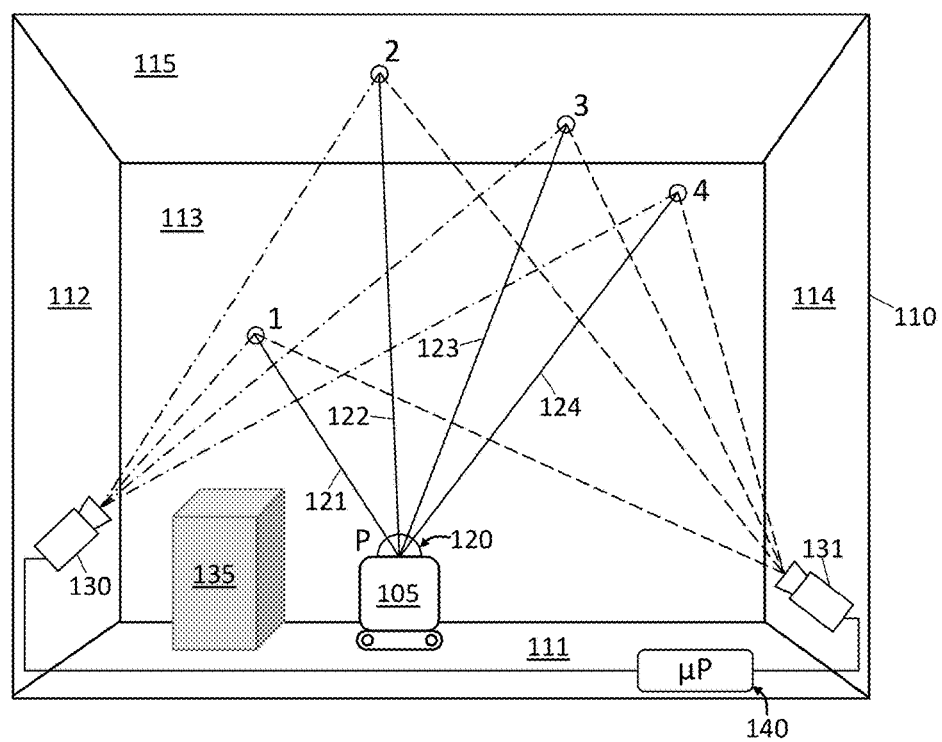
FIG. 1 shows an indoor navigation system.

Part I below describes an indoor navigation system based using space resection to find the position and orientation of a laser projector that creates landmarks on the walls of an indoor space.

Part II below describes advanced laser projection systems for use with the navigation system described in Part I.

Part I: Indoor Navigation System

The indoor navigation systems and methods described below involve solving a problem known in computer vision as "perspective pose estimation" and in photogrammetry as "space resection", namely: Determine the position of each of the vertices of a known triangle in three dimensional space given a perspective projection of the triangle. Haralick, et al. show how this problem was first solved by the German mathematician Grunert in 1841 and solved again by others later ("Review and Analysis of Solutions of the Three Point Perspective Pose Estimation Problem," International Journal of Computer Vision, 13, 3, 331-356 (1994), incorporated herein by reference).

Space resection has been used in the past to find the position and orientation of a camera based on the appearance of known landmarks in a camera image. Here, however, space resection is used to find the position and orientation of a laser projector that creates landmarks on the walls of an indoor space. In contrast to traditional space resection, in the present case angles to the landmarks are set by the laser projector rather than measured. When the projector is attached to an object, the position and orientation of the object may be estimated and tracked.

Navigation based on this new technique is well suited to indoor spaces such as office buildings, aircraft hangars, underground railway stations, etc. Briefly, a laser projector is attached to a robot, machine tool or other item whose position and orientation are to be estimated in an indoor space. The projector emits laser beams in four or more different directions and these beams are seen as spots on the walls of the indoor space. ("Walls" is defined to include walls, ceiling, floor and other surfaces in an indoor space upon which laser spots may be formed.) Multiple fixed cameras view the spots and provide data used to estimate their positions in three dimensions. Finally, the space resection problem is solved to estimate the position and orientation of the laser projector given the location of the spots on the walls and the relative directions of the laser beams transmitted from the object.

Indoor navigation based on multi-beam laser projection minimizes occlusion and sensitivity concerns through the use of a set of several laser beams spread out over a large solid angle. Multiple beams provide redundancy in cases such as a beam striking a wall or other surface at such an oblique angle that the center of the resulting spot is hard to determine, or half the beam landing on one surface and half landing on another. Having several beams pointed in various directions spread out over a half-sphere or greater solid angle, for example, largely eliminates sensitivity to unlucky geometries—small angles may be avoided. Each new measurement of laser projector position and orientation is directly referenced to building coordinates so measurement errors do not accumulate over time. Finally the computational requirements are modest and computations may be performed in a fixed unit separate from a tracked object.

The major components of a multi-beam laser projection indoor navigation system are: a laser projector, a set of observation cameras and a processor that solves space resection and other geometrical tasks. FIG. 1 shows such a system.

In FIG. 1 a robot 105 is situated in a room 110 that includes floor 111, walls 112, 113 and 114, and ceiling 115 ("walls" or "surfaces"). A laser projector 120 mounted on the robot emits four laser beams 121-124 which form spots 1-4. Spots 1 and 4 are on wall 113 while spots 2 and 3 are on ceiling 115. Although not illustrated here, spots may also fall on other surfaces and/or objects in the room. Cameras 130 and 131 are fixed in position such that they each can view spots 1-4 as suggested by the dash-dot and dashed lines. Opaque obstacle 135 blocks a direct line of sight from camera 130 to projector 120, but does not affect the operation of the navigation system. Microprocessor 140 (which includes associated memory and input/output devices) is in communication with cameras 130 and 131 via a wired or wireless data connection. Robot 105 is, of course, just an example of an object that may be tracked by the navigation system. Any object to which a laser projector can be attached would suffice.

When properly calibrated, cameras 130 and 131 may be used to estimate the three dimensional position of any point that both can see. For example if both cameras can see spots 1, 2, 3 and 4, then the three dimensional coordinates of each spot can be estimated in a coordinate system used to locate the walls and other features of the room. Meanwhile, laser projector emits laser beams 121-124 at known azimuths and elevations as measured with respect to the robot. The angle between each pair of laser beams is therefore also known. As discussed in detail below, this provides enough information to estimate the position and orientation of the laser projector, and the object to which it is attached, in room coordinates.

Figure 2:
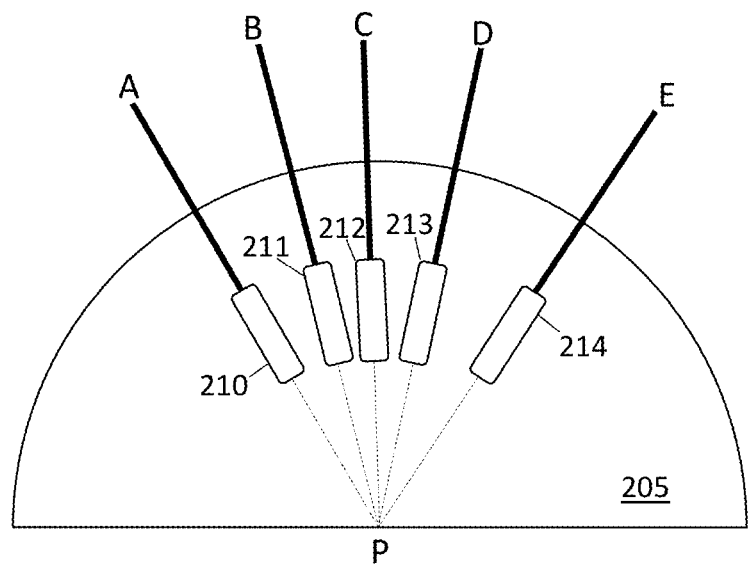
FIG. 2 illustrates a multi-beam laser projector.

FIG. 2 illustrates a multi-beam laser projector 205 in greater detail. In the example provided by FIG. 2, projector 205 emits five laser beams A, B, C, D and E. Four is a practical minimum number of beams and more is helpful. Despite the two-dimensional appearance of the figure, the beams do not all lie in a one plane. In an embodiment no more than two beams lie in any particular plane and the angle between any pair of laser beams is different from that between any other pair. In an embodiment the back projections of each beam intersect at common point, P. Said another way, directions of the laser beams coincide at point P. Point P need not lie inside the projector although it is illustrated that way in FIG. 2. The location and orientation at P may then be estimated by the navigation system.

FIG. 2 shows five lasers 210-214 provided to emit the five laser beams. However, fewer lasers may be used with beam splitters or diffractive elements to create multiple beams from one laser source. To avoid interference from room lighting the lasers may operate in the near infrared and the cameras may be equipped with near infrared bandpass optical filters. In an embodiment each laser beam is modulated or encoded so that it may be distinguished from all the others and identified by cameras equipped with appropriate demodulators or decoders. Commonly available diode lasers may be directly modulated with analog or digital signals up to tens of megahertz, suggesting, for example, sine wave modulation of each beam at a unique frequency. Alternatively, beams may be modulated with orthogonal digital codes in analogy to code-division multiple access radio systems. If one laser is split into several beams, then each beam may be provided with its own modulator.

Figure 3:
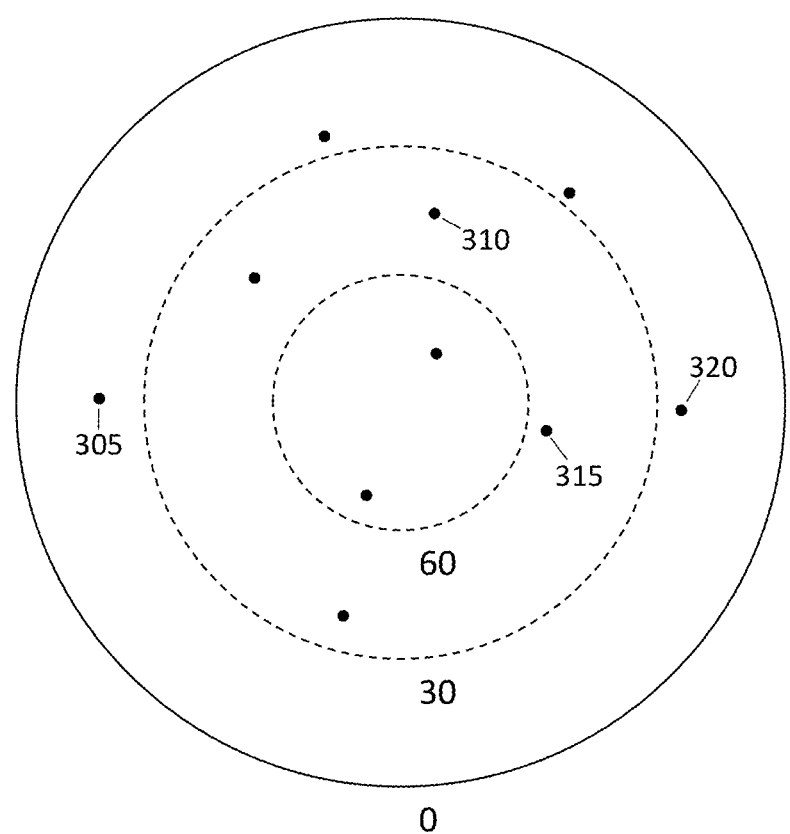
FIG. 3 is a map of projected laser beams.

FIG. 3 is a map of projected laser beams that helps visualize the situation of FIG. 2. Beams such as 305, 310, 315, 320 are represented in FIG. 3 as points where the beams would intersect a half-sphere placed over a projector such as 205. In the figure, "0", "30", and "60" represent degrees of elevation up from the horizon. Thus, for example, beams 310 and 315 are located between 30 and 60 degrees elevation. A set of laser beams spread out over the half sphere provides robustness against geometric ambiguities. Depending on the application, more beams may be placed at high elevations to avoid conflicts with potential obstructions such as object 135 in FIG. 1. A projector that emits beams below the horizon may also be used when the projector is far from the nearest room surface, for example on top of a tall robot. And, of course, the projector may be oriented sideways or even upside down for objects that move on walls or ceilings.

Figure 4:
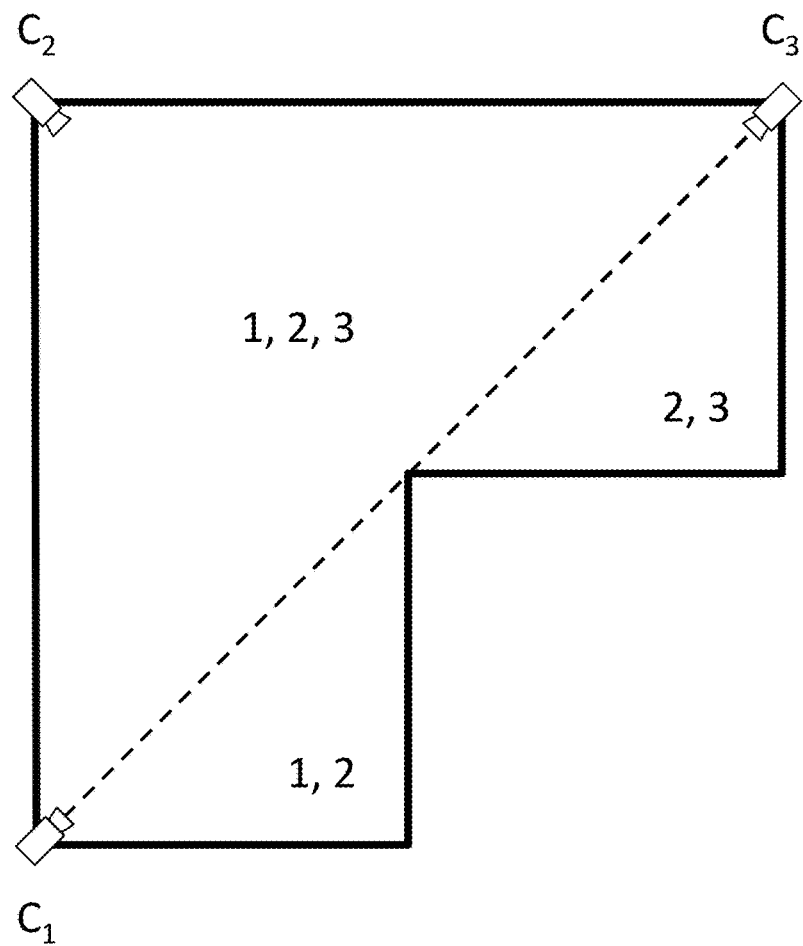
FIG. 4 illustrates a camera placement example.

Cameras, such as cameras 130 and 131 in FIG. 1 are used to estimate the position of laser spots on walls in three dimensions. This can be accomplished as long as a spot is viewable simultaneously by at least two cameras. When more cameras are available, the location of a spot may be estimated more robustly. FIG. 4 illustrates a camera placement example. In the example of FIG. 4, L-shaped room is monitored by three cameras, $C_1$, $C_2$ and $C_3$. The part of the room labeled "1, 2, 3" is viewable by all three cameras. The part labeled "1, 2" is viewable by cameras $C_1$ and $C_2$ only, while the part labeled "2, 3" is viewable by cameras $C_2$ and $C_3$ only. All parts of the room are viewable by at least two cameras.

If only one camera is available, but it is aimed at a scene with known geometry (e.g. a flat wall at a known location), then that is enough to locate laser spots. This situation may be hard to guarantee in practice, however. Using two or more cameras eliminates issues that arise when spots fall on surfaces at unknown locations. As described below, one known surface may be used during system calibration.

If the laser beams used in an indoor navigation system are near infrared, then corresponding filters may be used with the cameras to remove background room light. Similarly, if the laser beams are modulated or encoded, then the cameras may be equipped with corresponding demodulators or decoders. Finally, as used here, a "camera" includes processors or other components to demodulate or decode laser spots and report their two dimensional position in an image. Cameras may thus report a set of time-stamped two-dimensional spot coordinates to a central computer (e.g. 140 in FIG. 1) for processing. This data stream has low enough bandwidth requirements that a wireless link between cameras and the central computer may be used.

Figure 5:
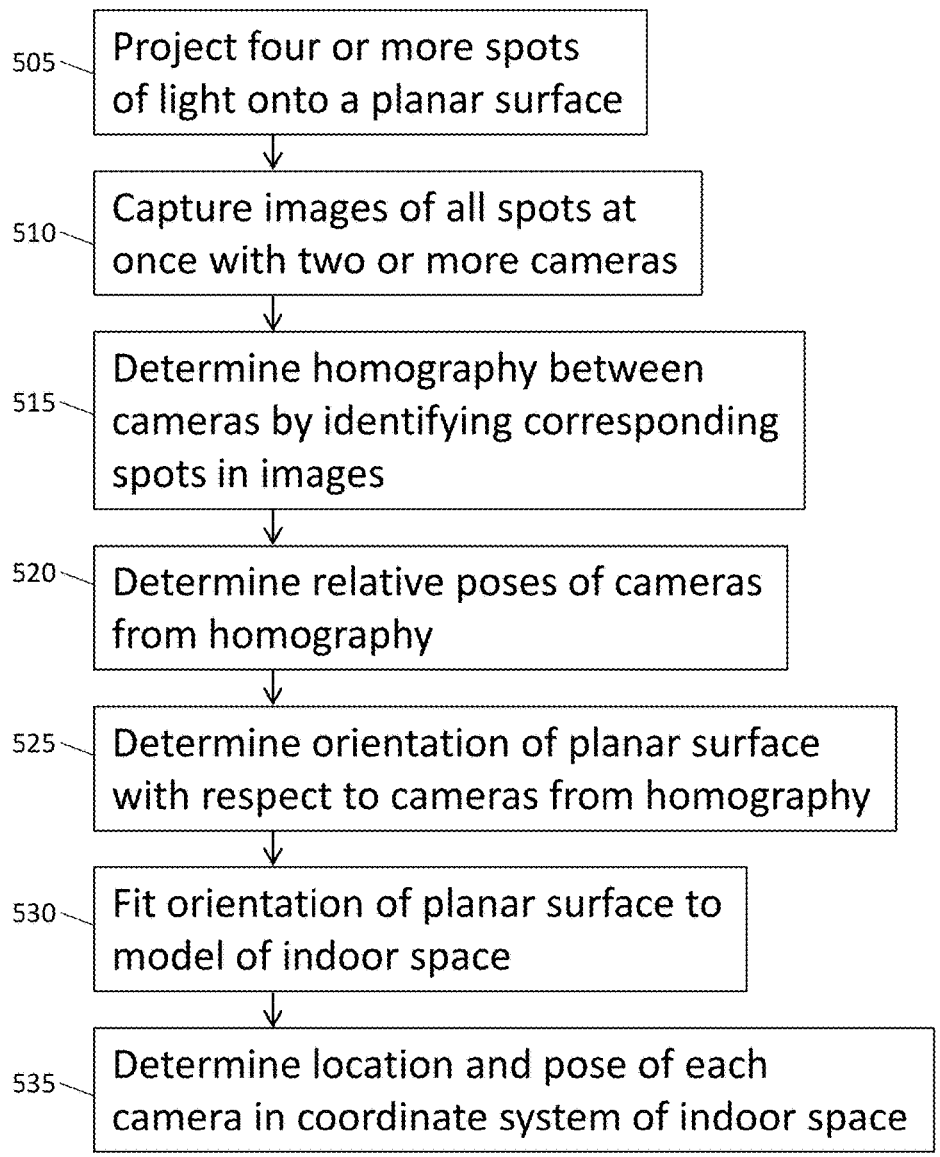
FIG. 5 is a flow chart for a calibration procedure.

Calibration is done to estimate the pose of each camera in room coordinates before navigation commences. FIG. 5 is a flow chart for one calibration procedure, others are possible. In general any method that results in the poses of each camera being determined in the coordinate system of the indoor space involved is sufficient. The procedure outlined here uses the same equipment that is later used for navigation.

The first steps 505 and 510 in the calibration procedure of FIG. 5 are to project four or more spots of light onto a planar surface such as a flat wall or ceiling and capture images of all of the spots with two or more cameras. The next step 515 is to determine or identify a homography between each pair of cameras by identifying corresponding spots in the images. The homography is then used to determine the relative poses of the cameras and the orientation of the planar surface with respect to the cameras; steps 520 and 525. Next, the planar surface is fit to a model of the indoor space of which it is a part; step 530. For example, a computer aided design model of a building may be available showing the location of a wall. Finally, the location and pose of each camera is determined in the coordinate system of the building or indoor space in step 535. Fitting a plane surface to a building design model removes an overall scale ambiguity that may not be resolvable from the homography alone. Repeating this procedure on two or more planar surfaces may also be helpful to resolve other geometric ambiguities that sometimes exist.

Figure 6A:
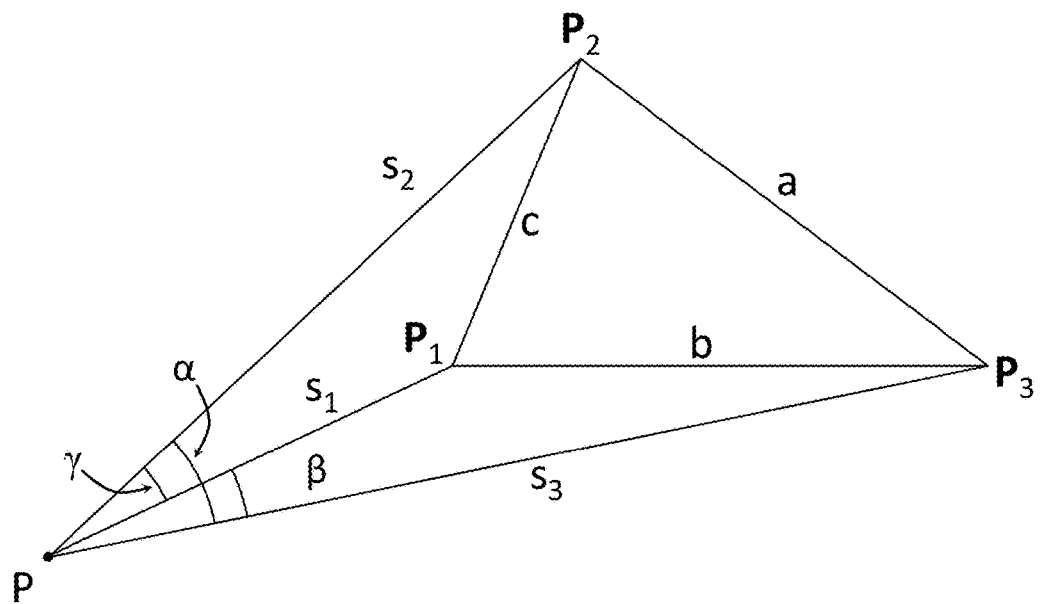
FIGS. 6A and 6B illustrate space resection geometry.
Figure 6B:
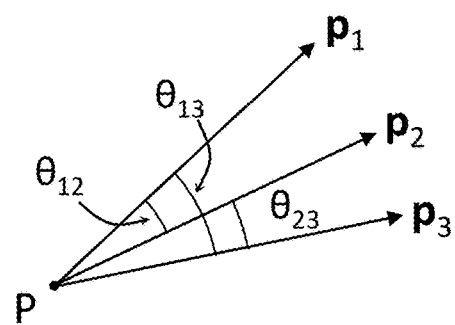

An example of indoor navigation using multi-beam laser projection is now presented using FIGS. 6A and 6B to illustrate space resection geometry. An object such as robot 105 in FIG. 1 is equipped with a laser projector as described above. The coordinate system of the object, also called the reference coordinate system, R, may be defined by two of the laser beams emitted by the projector. For example the origin of the reference coordinates may be at the intersection of the laser beams, point P in FIGS. 1, 2, 6A and 6B. The z-axis may then be defined to coincide with one of the beams and the y-axis may be the cross product of rays coincident with an ordered pair of the first beam and another beam. Coordinates used to describe a room or other indoor space are known as world coordinates, W.

After some introductory comments on notation, the example proceeds as follows. A set of reference unit vectors corresponding to the directions of laser beams projected from a laser projector are defined. Next, distances are defined from the projector to laser spots that appear on walls, ceilings or other surfaces. These distances are scalar numbers that multiply the reference unit vectors. The unit vectors and the distance scalars therefore define the position of observed laser spots in the reference (i.e. laser projector) coordinate system.

The next step in the example is to assume a transformation matrix that defines the relationship between reference and world coordinate systems. This matrix is used to find the position of observed laser spots in the world (i.e. room) coordinate system. The task of the navigation system is to find the transformation matrix given the reference unit vectors (from the design of the laser projector) and the laser spot locations in world coordinates (as observed by a set of calibrated cameras).

The mathematics of space resection has been worked out several times by various researchers independently over the last 170 years. Here we follow Haralick et al., "Review and Analysis of Solutions of the Three Point Perspective Pose Estimation Problem," International Journal of Computer Vision, 13, 3, 331-356 (1994); see, especially, p. 332-334. Other valid solutions to the space resection problem work just as well. It turns out that space resection based on three observed points often leads to more than one solution. Two solutions are common, but as many as four are possible. Thus, the next part of the example shows a way to determine which solution is correct. Finally, as an optional step, the four by four transformation matrix between reference and world coordinate systems expressed in homogenous coordinates is decomposed into Euler angles and a translation vector.

FIG. 6A is similar to Haralick FIG. 1. Point P is called the center of perspectivity by Haralick; here it is the location of the laser projector. Points $P_1$, $P_2$ and $P_3$ represent the locations of observed laser spots. Haralick uses $s_1$, $s_2$ and $s_3$ to represent the distances to these points. In the example below the distances are first defined as $m_1$, $m_2$ and $m_3$; these distances are then calculated following Haralick. a, b, c, $\alpha$, $\beta$, $\gamma$ in FIG. 6A correspond directly to the same symbols in Haralick. FIG. 6B illustrates unit vectors $p_1$, $p_2$ and $p_3$ that indicate the directions of laser beams emitted from a laser projector and are used to define the reference coordinate system. Angles $\theta_{ij}$ between unit vectors are discussed below.

Two functions are used to transform homogeneous coordinates to non-homogeneous coordinates and vice versa. $\mathcal{H}(\bullet)$ transforms non-homogeneous coordinates to homogenous coordinates while $\mathcal{H}^{-1}(\bullet)$ transforms homogeneous coordinates to non-homogeneous coordinates. Both functions operate on column vectors such that if $v=[v_1\ v_2\ \ldots\ v_n]^T$ then:

$$\mathcal{H}(v)=[v_1 v_2 \ldots v_n 1]^T$$

$$\mathcal{H}^{-1}(v)=[v_1/v_n, v_2/v_n \ldots v_{n-1}/v_n]^T \quad (1)$$

The pose in world coordinates of the object to be tracked can be defined as the coordinate transform between reference and world coordinate systems. The transform can be carried out by left-multiplying a 4 by 1 vector, describing a homogeneous three-dimensional coordinate, by a 4 by 4 matrix $X_{R \to W}$ to give another homogeneous, three-dimensional coordinate.

Let $p_1$, $p_2$, $p_3$, $p_4$ denote non-homogeneous coordinates on a unit sphere for reference rays in the reference coordinate system. (See, e.g. $p_1$, $p_2$ and $p_3$ in FIG. 6B). These rays are coincident with laser beams projected by the laser projector. Let $P_1^R$, $P_2^R$, $P_3^R$, $P_4^R$ denote 3D homogeneous coordinates of detected spots (i.e. points where laser beams are incident on walls or other surfaces) along the rays in the reference coordinate system. Then:

$$P_1^R = \mathcal{H}(m_1 p_1)$$

$$P_2^R = \mathcal{H}(m_2 p_2)$$

$$P_3^R = \mathcal{H}(m_3 p_3)$$

$$P_4^R = \mathcal{H}(m_4 p_4) \quad (2)$$

where $m_1$, $m_2$, $m_3$, $m_4$ are positive scalars that describe how far along each ray light is intercepted by a surface to create a detected spot. The homogeneous coordinates of the 3D detected spots in the world coordinate system are denoted by $P_1^W$, $P_2^W$, $P_3^W$, $P_4^W$ where:

$$P_1^W = X_{R \to W} P_1^R$$

$$P_2^W = X_{R \to W} P_2^R$$

$$P_3^W = X_{R \to W} P_3^R$$

$$P_4^W = X_{R \to W} P_4^R \quad (3)$$

The following reference unit vectors are defined for purposes of example:

$$p_1 = [-0.71037\ -0.2867\ 0.64279]^T$$

$$p_2 = [0.71037\ 0.2867\ 0.64279]^T$$

$$p_3 = [-0.88881\ 0.45828\ 0]^T$$

$$p_4 = [0.56901\ -0.37675\ 0.73095]^T \quad (4)$$

The angle $\theta_{ij}$ between $p_i$ and $p_j$ is given by $\theta_{ij}=\cos^{-1}(p_i^T p_j)$; therefore, $$\theta_{12}=100°, \theta_{13}=60°, \theta_{14}=80°$$

$$\theta_{23}=120°, \theta_{24}=40°, \theta_{34}=132.7° \quad (5)$$

The set of reference vectors $p_i$ has been chosen in this example such that the angle between each pair of vectors is different. This property helps avoid ambiguities in pose estimation but is not required. For purposes of illustration, $m_i$ are chosen as follows: $m_1=1$, $m_2=4$, $m_3=7$ and $m_4=10$. Then, using equation (2), we have:

$$P_1^R=[-0.71037 \; -0.2867 \; 0.64279 \; 1]^T$$

$$P_2^R=[2.8415 \; 1.1468 \; 2.5712 \; 1]^T$$

$$P_3^R=[-6.2217 \; 3.2079 \; 0 \; 1]^T$$

$$P_4^R=[5.6901 \; -3.7675 \; 7.3095 \; 1]^T \quad (6)$$

Let us assume the following transformation matrix:

$$X_{R \to W} = \begin{bmatrix} 0.917 & -0.38924 & 0.087156 & 7 \\ 0.39439 & 0.91746 & -0.052137 & 11 \\ -0.059668 & 0.082183 & 0.99483 & 0.1 \\ 0 & 0 & 0 & 1 \end{bmatrix} \quad (7)$$

Then, using equation (3), $$P_1^W=[6.5162 \; 10.423 \; 0.75829 \; 1]^T$$

$$P_2^W=[9.3834 \; 13.039 \; 2.5826 \; 1]^T$$

$$P_3^W=[0.046048 \; 11.489 \; 0.73487 \; 1]^T$$

$$P_4^W=[14.321 \; 9.4065 \; 6.7226 \; 1]^T \quad (8)$$

We now have the required inputs, $p_1$, $p_2$, $p_3$, $P_1^W$, $P_2^W$, $P_3^W$, for a space resection algorithm such as the one described in Haralick. The algorithm determines $X_{R \to W}$ up to a possible four-fold ambiguity. To resolve the ambiguity each real solution may be checked to see whether or not it projects $P_4^W$ to $p_4$. The space resection method detailed in Haralick first determines distances from the origin to each of the reference points. These distances are called $s_1$, $s_2$, $s_3$, by Haralick and if correctly calculated should be equal to $m_1$, $m_2$, $m_3$ respectively. Given these distances we can then calculate $P_1^R$, $P_2^R$, $P_3^R$.

Given the coordinates of three 3D points expressed in both the reference coordinate system and the world coordinate system one can find the transformation matrix between the two coordinate systems. This may be done by Procrustes analysis; see, for example Peter H. Schoenemann, "A Generalized Solution of the Orthogonal Procrustes Problem", Psychometrika, 1, 31, 1-10 (1966). A simpler method is presented below, however.

If a, b, c, $\alpha$, $\beta$, $\gamma$ take the meanings described in Haralick then they can be calculated as:

$$a=\|P_2^W-P_3^W\|=9.6436$$

$$b=\|P_1^W-P_3^W\|=6.5574$$

$$c=\|P_1^W-P_2^W\|=4.2882 \quad (9)$$

$$\cos \alpha = p_2^T \cdot p_3 = -0.5000$$

$$\cos \beta = p_1^T \cdot p_3 = 0.5000$$

$$\cos \gamma = p_1^T \cdot p_2 = -0.1736 \quad (10)$$

Inserting these values into Haralick's equation (9) gives:

$$A_4=0.1128, A_3=-1.5711, A_2=6.5645, A_1=-8.6784,$$
$$A_0=7.2201 \quad (11)$$

The quartic function in v with these coefficients has the following roots:

$$v=7.0000 \text{ or } v=5.4660 \text{ or } v=0.7331-1.065i \text{ or }$$
$$v=0.7331+1.066i \quad (12)$$

The complex roots may be ignored and the real roots substituted into Haralick's equation (8) to give corresponding values for u:

$$u=4.0000, v=7.0000 \text{ or } u=2.9724, v=5.4660 \quad (13)$$

Substituting u and v into Haralick's equations (4) and (5) leads to:

$$s_1=1.0000, s_2=4.0000, s_3=7.0000$$

or $$s_1=1.3008, s_2=3.8666, s_3=7.1104 \quad (14)$$

One can see that the first solution corresponds to the values picked for $m_1$, $m_2$, $m_3$ above. Of course, at this point we know this only because we know how the problem was constructed. We will now recover the transformation, $X_{R \to W}$, for each solution and then determine which solution is correct.

It is noted in Haralick and elsewhere that the transformation has 12 parameters but the point correspondences only give 9 equations. The conventional solution to this problem is to enforce orthogonality constraints in the rotation part of the transform to reduce the number of parameters. However there is an easier and somewhat surprising method; we can manufacture a virtual fourth point whose location is linearly independent from those of the first three points. This virtual point is consistent with a rigid transformation, so its coordinates and those of the three actual points, as expressed in the reference and world coordinate systems, give the transformation directly.

The fourth point is found by considering the vectors from one actual point to each of the other two. If we take a point that is separated from the first point by the cross product of the two vectors then we can be sure that it is not coplanar with the three actual points and is therefore linearly independent. Since in a Euclidean transform the vectors are simply rotated, so is their cross product. Hence we have a fourth point correspondence which is linearly independent but enforces the orthogonality constraint.

We call this point $P_5^R$ in the reference coordinate system and $P_5^W$ in the world coordinate system. Formally it may be defined as:

$$P_5^R = \mathcal{H}(\mathcal{H}^{-1}(P_1^R) + (\mathcal{H}^{-1}(P_2^R) - \mathcal{H}^{-1}(P_1^R)) \times$$
$$(\mathcal{H}^{-1}(P_3^R) - \mathcal{H}^{-1}(P_1^R)))$$

$$P_5^W = \mathcal{H}(\mathcal{H}^{-1}(P_1^W) + (\mathcal{H}^{-1}(P_2^W) - \mathcal{H}^{-1}(P_1^W)) \times$$
$$(\mathcal{H}^{-1}(P_3^W) - \mathcal{H}^{-1}(P_1^W))) \quad (15)$$

We first consider the solution where $s_1=1.0000$, $s_2=4.0000$, $s_3=7.0000$. Calculated values are indicated using a 'hat'. For example:

$$\hat{P}_1^R = \mathcal{H}(s_1 p_1) = [-0.7104 \; -0.2867 \; 0.6428 \; 1]^T$$

$$\hat{P}_2^R = \mathcal{H}(s_2 p_2) = [2.8415 \; 1.1468 \; 2.5712 \; 1]^T$$

$$\hat{P}_3^R = \mathcal{H}(s_3 p_3) = [-6.2217 \; 3.2079 \; 0 \; 1]^T \quad (16)$$

Using equation (15) we find:

$$\hat{P}_5^R = [-8.3707 \; -8.6314 \; 20.9556 \; 1]^T$$

$$\hat{P}_5^W = [4.5101 \; -1.3129 \; 20.7373 \; 1]^T \quad (17)$$

Stacking 3D point correspondences gives:

$$[P_1^W | P_2^W | P_3^W | \hat{P}_5^W] = \hat{X}_{R \to W} [\hat{P}_1^R | \hat{P}_2^R | \hat{P}_3^R | \hat{P}_5^R] \quad (18)$$

$$\hat{X}_{R \to W} = [P_1^W | P_2^W | P_3^W | \hat{P}_5^W][\hat{P}_1^R | \hat{P}_2^R | \hat{P}_3^R | \hat{P}_5^R]^{-1}$$

$$\hat{X}_{R \to W} = \begin{bmatrix} 6.5162 & 9.3834 & 0.0460 & 4.5101 \\ 10.4233 & 13.0387 & 11.4894 & -1.3129 \\ 0.7583 & 2.5826 & 0.7349 & 20.7373 \\ 1 & 1 & 1 & 1 \end{bmatrix} \begin{bmatrix} -0.7104 & 2.8415 & -6.2217 & -8.3707 \\ -0.2867 & 1.1468 & 3.2079 & -8.6314 \\ 0.6428 & 2.5712 & 0.0000 & 20.9556 \\ 1 & 1 & 1 & 1 \end{bmatrix}^{-1}$$

$$\hat{X}_{R \to W} = \begin{bmatrix} 0.9170 & -0.3892 & 0.0872 & 7.0000 \\ 0.3944 & 0.9175 & -0.0521 & 11.0000 \\ -0.0597 & 0.0822 & 0.9948 & 0.1000 \\ 0 & 0 & 0 & 1 \end{bmatrix}$$

Comparison with equation (7) shows that this is the correct solution. This may be verified independently by transforming the fourth world point into reference coordinates, projecting it onto the unit sphere, and comparing to the corresponding reference unit vector:

$$\hat{P}_4^R = \hat{X}_{R \to W}^{-1} P_4^W = [5.6901 \; -3.7675 \; 7.3095 \; 1]^T$$

$$\hat{p}_4 = \mathcal{H}^{-1}(\hat{P}_4^R)/\|\mathcal{H}^{-1}(\hat{P}_4^R)\| = [0.5690 \; -0.3767 \; 0.7310]^T \quad (19)$$

Comparing this to equation (4) shows that the fourth world point does indeed agree with the fourth reference coordinate and we can therefore conclude that the calculated transform is correct.

Now consider the second solution where $s_1 = 1.3008$, $s_2 = 3.8666$, $s_3 = 7.1104$. Plugging these values into equation (2) gives:

$$\hat{P}_1^R = [-0.9241 \; -0.3729 \; 0.8362 \; 1]^T$$

$$\hat{P}_2^R = [2.7467 \; 1.1085 \; 2.4854 \; 1]^T$$

$$\hat{P}_3^R = [-6.3198 \; 3.2585 \; 0.0000 \; 1]^T$$

$$\hat{P}_4^R = [-8.1519 \; -6.2022 \; 22.1599 \; 1]^T \quad (20)$$

Stacking these points as we did in equation (18) leads to the transform matrix:

$$\hat{X}_{R \to W} = \begin{bmatrix} 6.5162 & 9.3834 & 0.0460 & 4.5101 \\ 10.4233 & 13.0387 & 11.4894 & -1.3129 \\ 0.7583 & 2.5826 & 0.7349 & 20.7373 \\ 1 & 1 & 1 & 1 \end{bmatrix} \begin{bmatrix} -0.9241 & 2.7467 & -6.3198 & -8.1519 \\ -0.3729 & 1.1085 & 3.2585 & -6.2022 \\ 0.8362 & 2.4854 & 0.0000 & 22.1599 \\ 1 & 1 & 1 & 1 \end{bmatrix}^{-1} \quad (21)$$

$$\hat{X}_{R \to W} = \begin{bmatrix} 0.9043 & -0.4153 & 0.0989 & 7.1142 \\ 0.4265 & 0.8898 & -0.1626 & 11.2852 \\ -0.0205 & 0.1892 & 0.9817 & -0.009 \\ 0 & 0 & 0 & 1 \end{bmatrix}$$

Testing this with the fourth world point leads to:

$$\hat{P}_4^R = \hat{X}_{R \to W}^{-1} P_4^W = [5.5783 \; -3.3910 \; 7.6286 \; 1]^T$$

$$\hat{p}_4 = \mathcal{H}^{-1}(\hat{P}_4^R)/\|\mathcal{H}^{-1}(\hat{P}_4^R)\| = [0.5556 \; -0.3377 \; 0.7598]^T \quad (22)$$

Here the elements of $\hat{p}_4$ differ from those of $p_4$ (see equation (4)) indicating that this is not a correct solution.

For many purposes it is unnecessary to decompose the transformation matrix, $\hat{X}_{R \to W}$; however we present the decomposition here for completeness. The transform describes directly how the basis vectors of one coordinate system relate to the basis vectors of another. The coordinate system is defined by the point at infinity on the x-axis, the point at infinity on the y-axis, the point at infinity on the z-axis, and the origin. We denote the basis vectors of the reference coordinate system in world coordinates as $B_R^W$, and the basis vectors of the reference coordinate system in reference coordinates as $B_R^R$. If we stack the basis vectors we get the four by four identity matrix:

$$B_R^R = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad (23)$$

Since, $$B_R^W = \hat{X}_{R \to W} B_R^R = \hat{X}_{R \to W} \quad (24)$$

the transformation can be read as the basis vectors of the reference coordinate system in the world coordinate system. Thus the question "What is the position of the reference system (i.e. the laser projector)?" is equivalent to asking "Where is the origin of the reference coordinate frame in the world coordinate system?" This is given by the fourth column of $\hat{X}_{R \to W}$; the column that corresponds to $[0 \; 0 \; 0 \; 1]^T$ in $B_R^R$. Likewise the other columns tell us how the reference frame has rotated (i.e. the orientation of the laser projector). However, those unfamiliar with projective geometry often prefer to consider the rotation in terms of Euler angles. For a z-y-x Euler sequence we can consider the transformation to be composed as:

$$\hat{X}_{R \to W} = T(\hat{x}, \hat{y}, \hat{z}) R_x(\hat{\theta}_x) R_y(\hat{\theta}_y) R_z(\hat{\theta}_z) \quad (25)$$

... where ...

$$R_z(\hat{\theta}_z) = \begin{bmatrix} \cos(\hat{\theta}_z) & -\sin(\hat{\theta}_z) & 0 & 0 \\ \sin(\hat{\theta}_z) & \cos(\hat{\theta}_z) & 0 & 0 \\ 0 & 0 & 1 & 0 \\ 0 & 0 & 0 & 1 \end{bmatrix}$$

$$R_y(\hat{\theta}_y) = \begin{bmatrix} \cos(\hat{\theta}_y) & 0 & \sin(\hat{\theta}_y) & 0 \\ 0 & 1 & 0 & 0 \\ -\sin(\hat{\theta}_y) & 0 & \cos(\hat{\theta}_y) & 0 \\ 0 & 0 & 0 & 1 \end{bmatrix}$$

$$R_x(\hat{\theta}_x) = \begin{bmatrix} 1 & 0 & 0 & 0 \\ 0 & \cos(\hat{\theta}_x) & -\sin(\hat{\theta}_x) & 0 \\ 0 & \sin(\hat{\theta}_x) & \cos(\hat{\theta}_x) & 0 \\ 0 & 0 & 0 & 1 \end{bmatrix}$$

$$T(\hat{x}, \hat{y}, \hat{z}) = \begin{bmatrix} 1 & 0 & 0 & \hat{x} \\ 0 & 1 & 0 & \hat{y} \\ 0 & 0 & 1 & \hat{z} \\ 0 & 0 & 0 & 1 \end{bmatrix}$$

In this convention $\theta_z$ (yaw) is a counter-clockwise rotation about the z-axis, $\theta_y$ (pitch) is a counter-clockwise rotation about the new y-axis, $\theta_x$ (roll) is a counter-clockwise rotation about the new x-axis. To avoid singularities in the inversion of the transform $\theta_y$ is restricted to the open interval $-90° < \theta_y < 90°$. When $\theta_y = \pm 90°$ gimbal lock occurs and Euler angles are inadequate for describing the rotation. With this caveat the transform can be decomposed as:

$$\hat{\theta}_x = \operatorname{atan2}(-\hat{r}_{23}, \hat{r}_{33}) \quad (26)$$

$$\hat{\theta}_y = \sin^{-1}(\hat{r}_{13})$$

$$\hat{\theta}_z = \operatorname{atan2}(-\hat{r}_{12}, \hat{r}_{11})$$

... where ...

$$\hat{X}_{R \to W} = \begin{bmatrix} \hat{r}_{11} & \hat{r}_{12} & \hat{r}_{13} & \hat{x} \\ \hat{r}_{21} & \hat{r}_{22} & \hat{r}_{23} & \hat{y} \\ \hat{r}_{31} & \hat{r}_{32} & \hat{r}_{33} & \hat{z} \\ 0 & 0 & 0 & 1 \end{bmatrix}$$

Applying this to the transformation of equation (18) we get:

$$\hat{X}_{R \to W} = \begin{bmatrix} 0.9170 & -0.3892 & 0.0872 & 7.0000 \\ 0.3944 & 0.9175 & -0.0521 & 11.0000 \\ -0.0597 & 0.0822 & 0.9948 & 0.1000 \\ 0 & 0 & 0 & 1 \end{bmatrix} \quad (27)$$

$$\hat{\theta}_x = \operatorname{atan2}(-0.0521, 0.9948) = 3°$$

$$\hat{\theta}_y = \sin^{-1}(0.0872) = 5°$$

$$\hat{\theta}_z = \operatorname{atan2}(-0.3892, 0.9170) = 23°$$

$$\hat{x} = 7$$

$$\hat{y} = 11$$

$$\hat{z} = 0.1$$

Thus the position of the origin of the reference coordinate system (i.e. the position of the laser projector) expressed in the world coordinate system is (7, 11, 0.1) and the orientation of the laser projector in the world coordinate system is described by Euler angles 3°, 5° and 23°.

To recap: Knowledge of the location of laser spots on the walls of a room, combined with knowledge of the relative directions of laser beams emitted by a laser projector, leads to the location and orientation of the laser projector expressed in room coordinates. The location of the spots is determined with a calibrated set of cameras and the relative directions of the projected laser beams are set during manufacture and/or set-up of the laser projector.

A few subtleties of the system and methods described above are worth mentioning or revisiting at this point. For example, in an embodiment the directions of each laser beam coincide at a point, P. If this is not the case the mathematics of the space resection problem becomes more complicated.

Correspondences between laser beams and their spots may be accomplished by trial and error until a solution to the space resection problem is found. This process is made more robust when the angles between pairs of laser beams are different.

Alternatively, each laser beam may be modulated or encoded to facilitate identification. Each beam may be modulated with its own frequency sine wave or its own pseudo random code, as examples. Demodulating cameras may be used to identify beams or demodulation may be done later using a separate microprocessor. Unique beam identification becomes even more helpful when multiple laser projectors (e.g. on multiple robots or other objects) are tracked at once.

The use of four, five or even more beams per laser projector helps make the system more robust in the face of potential geometric ambiguities. Furthermore, once an ambiguity has been resolved, such as finding that the first rather than the second solution is correct in the example above, it will tend to stay resolved in the same way as a tracked object makes incremental movements from one location and pose to the next.

Figure 7:
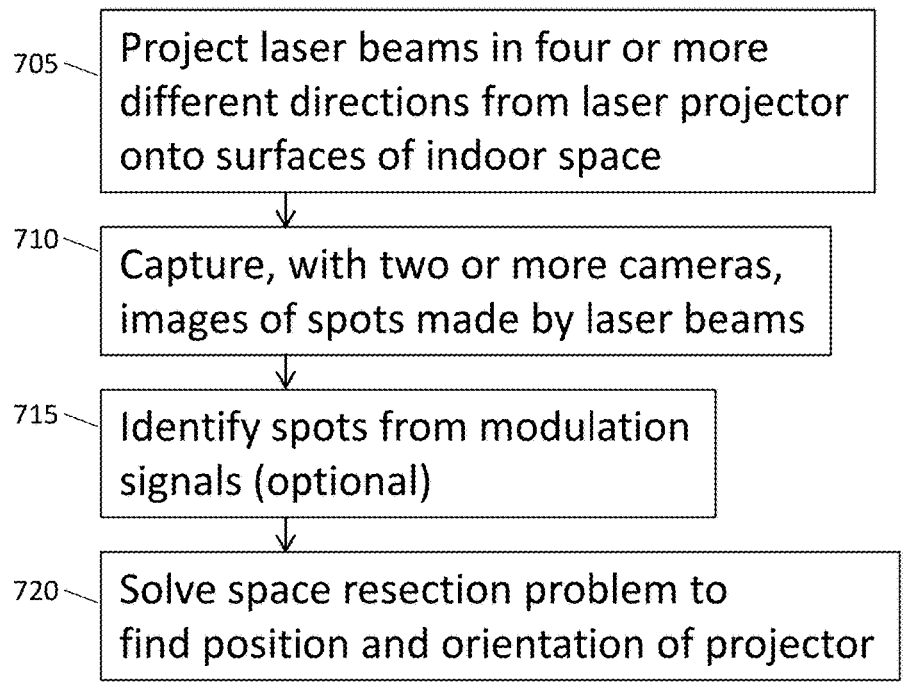
FIG. 7 is a flow chart for an indoor navigation method.

In light of the detailed example given above and the subtleties just mentioned, FIG. 7 is a flow chart for an indoor navigation method. According to FIG. 7, the first step 705 in the method is to project laser beams in four or more different directions from a laser projector onto surfaces of an indoor space. Next, in step 710, images of the spots made by the beams are captured with two or more cameras. At least two cameras are necessary to determine the three dimensional position of the laser spots in the coordinate system of the indoor space. Ideally images are captured by each camera at the same time. Delay between images may reduce the accuracy of the system depending on the speed of a tracked object. Cameras may provide a time-stamp along with the two dimensional coordinates of observed laser spots so that a processor can use sets of spots observed as close to simultaneously as possible.

The next step 715 is to identify the observed points based on unique modulation signals applied to each laser beam. This step is not required if no laser modulation is used. Given the observed location of laser spots as determined from data supplied by two or more cameras and knowledge of the geometry of the laser projector, the space resection problem is now solved in step 720. The solution may proceed in analogy to the example provided above or it may use another method. The solution may include resolving geometric ambiguities which may arise.

The solution includes comparing the coordinates of known points (e.g. laser spots) as expressed in reference and world coordinates to find a matrix describing a coordinate transform between the two coordinate systems. This may be done though Procrustes analysis or using the method of manufacturing a virtual, linearly independent point as described above.

A system including a multi-beam laser projector attached to an object to be tracked, a set of calibrated cameras that observe laser spots on the walls of a room, and a processor that solves the space resection problem is thus able to provide an indoor navigation solution. The system avoids many difficulties associated with traditional camera-based navigation including issues such as occlusion and geometric insensitivity while requiring neither extraordinary processing power nor high-bandwidth data transfer.

Part II: Advanced Laser Projection Systems

The purpose of advanced laser projection systems described below is to increase the number of observable laser spots on the surfaces of an indoor space. More spots can make an indoor navigation system more robust by helping to avoid poor spot geometries, mitigating occlusions, and providing additional measurements to resolve ambiguities.

Previously the location and orientation of a tracked object, e.g. a robot, were determined from observations of laser spots projected from a projector rigidly attached to the tracked object. In other words, the relative orientation of the tracked object and the laser projector was fixed. In an advanced laser projection system, however, a projector may be mounted on a tip/tilt platform or gimbal mount attached to the tracked object instead of directly on the tracked object. (Note: "Tracked object" means an object whose position and orientation are desired; it is not meant to specify whether or not an object, such as a robot, travels on tracks.)

The space resection method used to find the position and orientation of the tracked object remains the same. However, an additional coordinate transformation may be needed to relate laser projector attitude to tracked object attitude.

Advanced projection systems increase the number of observable spots but may slow down position update rate if not all spots are available simultaneously. Spots may appear in groups or one-by-one depending on the projection system.

Figure 8:
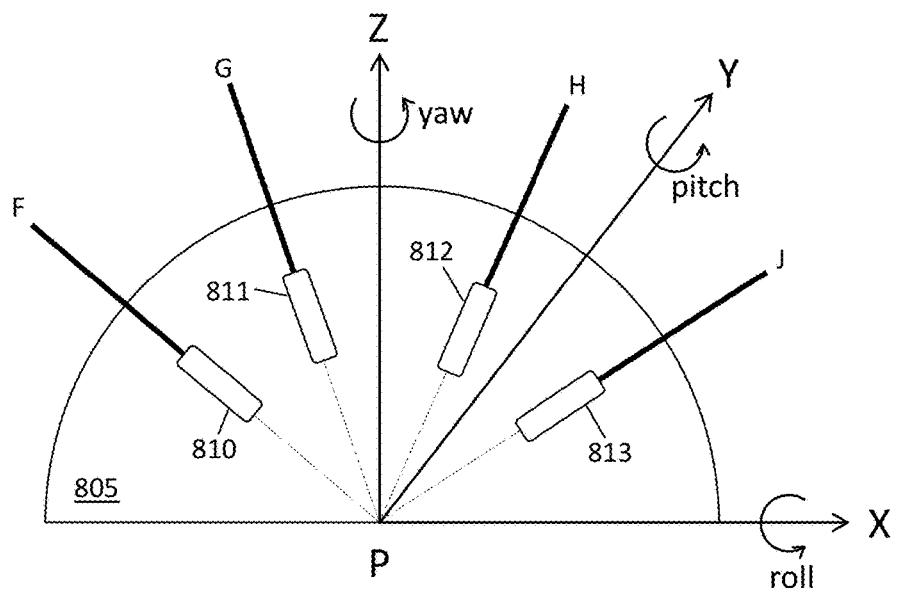
FIG. 8 illustrates a multi-beam laser projector that can rotate around roll, pitch and yaw axes.

FIG. 8 illustrates a multi-beam laser projector 805 that can rotate around roll, pitch and yaw axes: X, Y and Z. Projector 805 emits four laser beams F, G, H and J. Despite the two-dimensional appearance of the figure, the beams need not all lie in a one plane. In an embodiment no more than two beams lie in any particular plane and the angle between any pair of laser beams is different from that between any other pair. FIG. 8 shows four lasers 810-813 provided to emit the four laser beams.

In an embodiment the back projections of each beam intersect at common point, P. Said another way, directions of the laser beams coincide at point P. Roll, pitch and yaw axes (X, Y and Z) intersect at P. Thus roll, pitch and yaw rotations change the orientation of the projector with respect to a tracked object, but not the position of point P.

Figure 9:
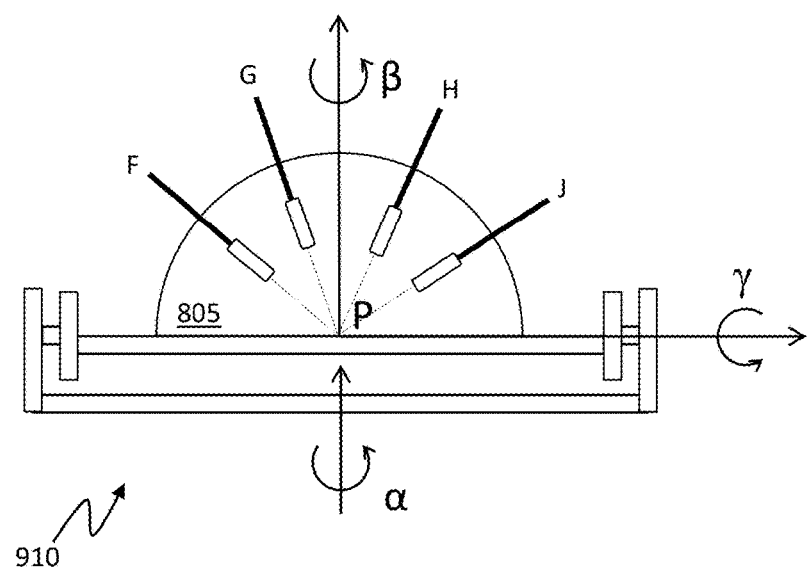
FIG. 9 illustrates a multi-beam laser projector mounted on a gimbal mount.

One way to provide the roll, pitch and yaw degrees of freedom illustrated in FIG. 8 is to mount multi-beam laser projector 805 on a gimbal mount 910 as shown in FIG. 9. The mount permits the projector to rotate through roll, pitch and yaw Euler angles $\gamma$, $\beta$ and $\alpha$, respectively. The gimbal mount may be fixed to a tracked object such as a robot.

As an example, if projector 805 and mount 910 are configurable in two different orientations, $\alpha_1$, $\beta_1$, $\gamma_1$ and $\alpha_2$, $\beta_2$, $\gamma_2$, then laser beams F, G, H and J, create two sets of spots on the surfaces of an indoor space, one corresponding to the first configuration and another to the second. The space resection problem may then be solved twice to find the position and orientation at point P.

Figure 10:
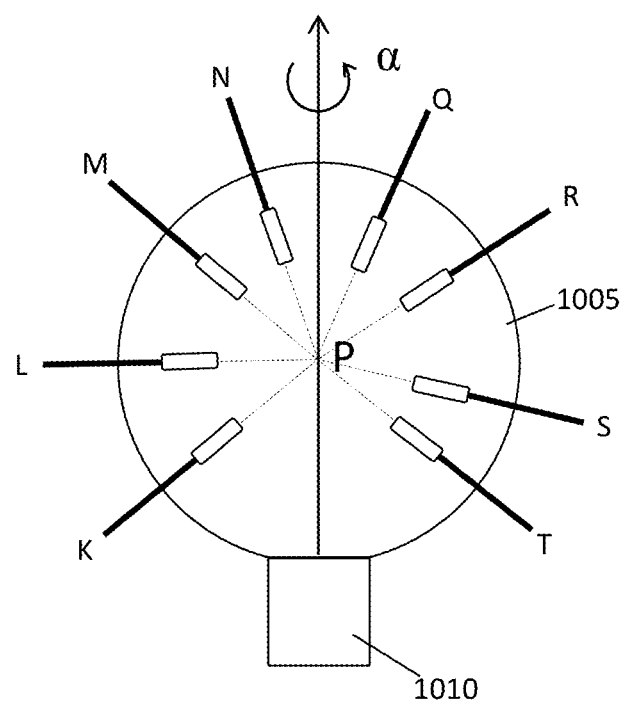
FIG. 10 illustrates a multi-beam laser projector that may emit beams in almost any direction.

Full $\alpha$, $\beta$, $\gamma$ rotational freedom is not always necessary. FIG. 10 illustrates a multi-beam laser projector 1005 that may emit beams in almost any direction. The projector is mounted on a rotation mount 1010 that permits only yaw rotation as indicated by yaw angle $\alpha$. Despite the two-dimensional appearance of the figure, laser beams K, L, M, N, Q, R, S, T need not all lie in a one plane. In an embodiment no more than two beams lie in any particular plane and the angle between any pair of laser beams is different from that between any other pair. In an embodiment the back projections of the beams intersect at common point, P. Said another way, directions of the laser beams coincide at point P.

The configuration of laser projector 1005 is specified by yaw angle $\alpha$. Sets of spots projected by laser beams K . . . T may be grouped according to yaw angle. Thus one set of spots may correspond to $\alpha=\alpha_1$ and another to $\alpha=\alpha_2$, for example. Rotation mount 1010 may be fixed to a tracked object, such as a robot.

If the orientation of a tracked object is desired, then the relative orientation between the laser projector and the tracked object is needed, e.g. angles $\alpha$, $\beta$, $\gamma$ in FIG. 9 or angle $\alpha$ in FIG. 10. On the other hand, if only the position of a tracked object is required, then relative orientation of the projector and the object is not needed as long as the position of point P is fixed with respect to the object. In either case, the space resection problem can only be solved when angles between laser beams that generate spots are known.

Figure 11:
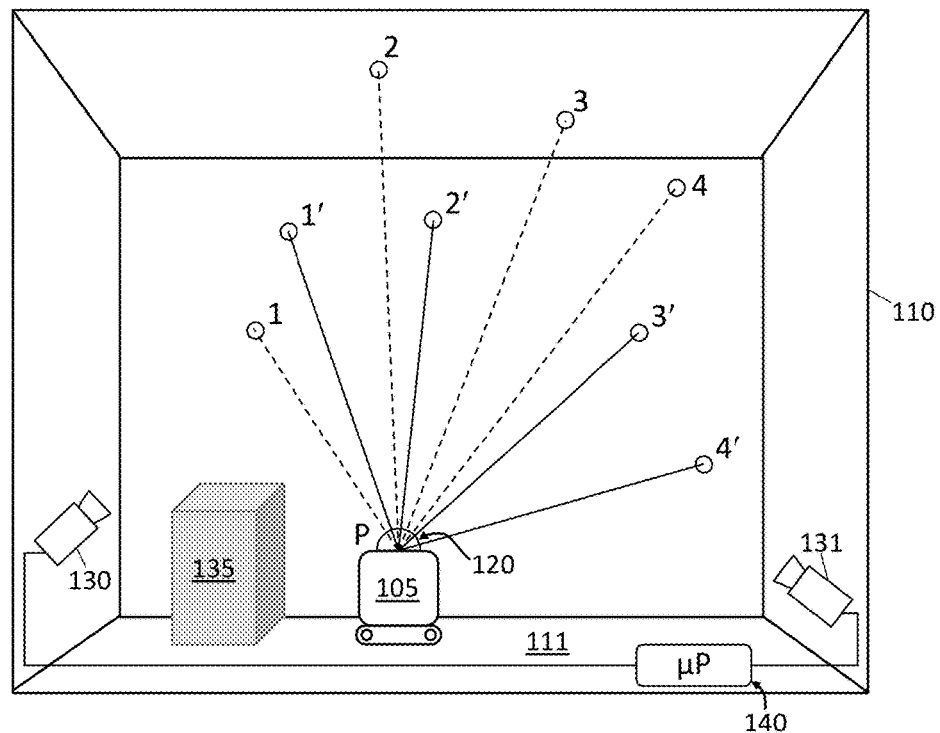
FIG. 11 shows an indoor navigation system in which a multi-beam laser projector emits beams in sets.

FIG. 11 shows an indoor navigation system in which a multi-beam laser projector emits beams in sets. FIG. 11 is similar to FIG. 1 and like reference numbers refer to the same items in each figure. However, in FIG. 11 laser projector 120 is rotatable through Euler angles $\alpha$, $\beta$, $\gamma$ and is therefore capable of generating two sets of laser spots on the walls of room 110: spots 1-4 and spots 1'-4'. Microprocessor 140 may solve the space resection problem twice, once for each set of spots. Of course, projector 120 may be capable of projecting many more sets of spots associated with different sets of Euler angles.

The angles between laser beams are the same for each set of spots, but the relative orientation of the set of laser beams and the tracked object is different. This relative orientation must be communicated to microprocessor 140 if the attitude of the object (e.g. robot 105) is desired. On the other hand, the position of point P (and the robot) may be determined without knowing the relative orientation between laser projector and the object. Data describing the orientation of the laser projector with respect to the tracked object may be communicated as part of a laser beam modulation pattern or by another data link.

The orientation of the tracked object may be obtained using a transformation between reference (i.e. laser projector) coordinates and tracked-object coordinates. The rotation may be expressed with Euler angles:

$$\begin{bmatrix} O_X \\ O_Y \\ O_Z \end{bmatrix} = \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{bmatrix} \begin{bmatrix} R_X \\ R_Y \\ R_Z \end{bmatrix}$$

Here $[O_X O_Y O_Z]^T$ is a vector in the tracked object coordinate system and $[R_X R_Y R_Z]^T$ is a vector in the projector (reference) coordinate system. $\alpha$, $\beta$ and $\gamma$ are counterclockwise rotation angles of the projector around object axes Z, Y and X respectively where $\gamma$ rotation is performed first, then $\beta$ rotation, and $\alpha$ rotation last. (This coordinate transformation assumes that object and reference coordinate systems are related by rotation without translation.)

As a simple example, if projector 1005 of FIG. 10 rotates around the Z axis with rotation rate $\omega$ radians per second (i.e. $\alpha = \omega t$ and $\beta = \gamma = 0$), then $$\begin{bmatrix} O_X \\ O_Y \\ O_Z \end{bmatrix} = \begin{bmatrix} \cos\omega t & -\sin\omega t & 0 \\ \sin\omega t & \cos\omega t & 0 \\ 0 & 0 & 1 \end{bmatrix} \begin{bmatrix} R_X \\ R_Y \\ R_Z \end{bmatrix}$$

Figure 12:
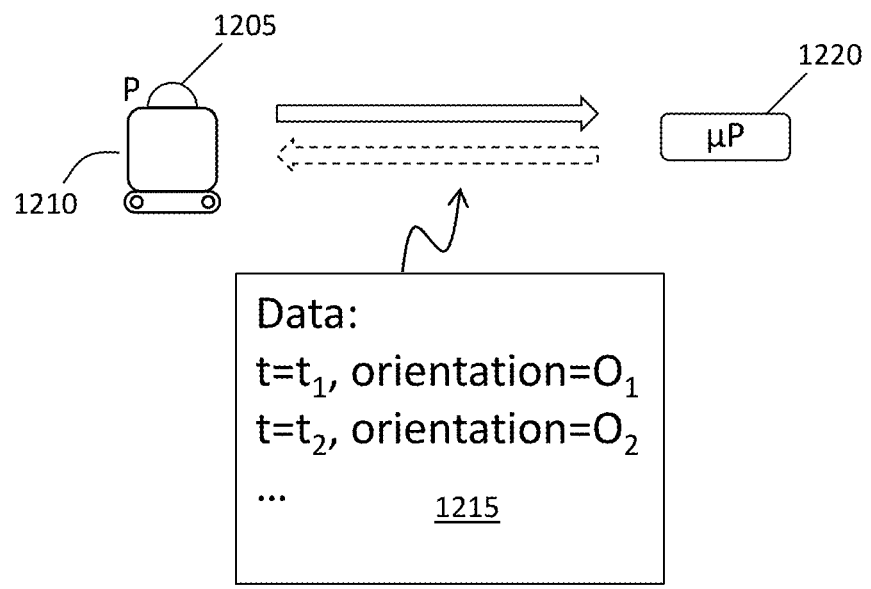
FIG. 12 illustrates orientation data communication between a multi-beam laser projector and a microprocessor.

In this case the position of spots generated by lasers K ... T is a function of time. If the orientation of a tracked object is desired, then orientation data must be exchanged between the projector and the processor performing space resection. FIG. 12 illustrates orientation data communication between a multi-beam laser projector and a microprocessor.

In FIG. 12 multi-beam laser projector 1205 is attached, but rotatable with respect to, a tracked object, robot 1210. The projector communicates data 1215 to microprocessor 1220: at time $t_1$ for example, the relative orientation of the projector with respect to the tracked object is $O_1$. Microprocessor 1220 solves the space resection problem (as described in Part I above) for sets of laser spots observed at various times. For example the space resection problem may be solved for laser spots observed at time $t=t_1$ and the position and orientation of laser projector 1205 estimated at that time. If the orientation of robot 1210 is also desired at $t_1$, then a coordinate transformation based on orientation data $O_1$ may be used to relate projector and robot orientations. Orientation data may include Euler angles describing a coordinate transformation between object and projector coordinate systems.

An advanced laser projector may report its orientation to a microprocessor. Alternatively a microprocessor may command a laser projector to a assume specific orientation. Thus orientation data may be transferred between projector and processor in either direction. Orientation data may be communicated via standard wired or wireless links, or it may be included in a laser modulation scheme.

As an example, consider a laser projector that operates in several orientations. Lasers in the projector may be modulated, for example to aid beam identification. Modulation may also specify the orientation of the projector. Spot detection cameras may then demodulate observed laser spots. The cameras then report spot position, laser beam identification and laser projector orientation information to a microprocessor as inputs to a space resection navigation method.

Roll, pitch and yaw rotations of a multi-beam laser projector may be implemented in various ways including the use of gimbal and single-axis spinning mounts described above. Similar effects may also be obtained with scan mirror systems or spatial light modulators.

Figure 13:
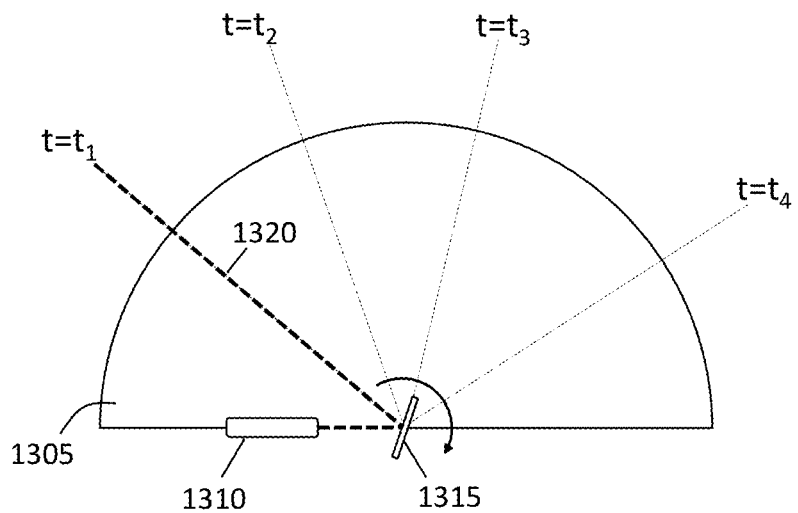
FIG. 13 illustrates a laser projector based on a laser beam deflected by a scan mirror.

FIG. 13 illustrates a laser projector based on a laser beam deflected by a scan mirror. In FIG. 13, laser projector 1305 includes laser 1310 which emits a beam incident on scan mirror 1315. Reflected beam 1320 is shown at time $t=t_1$. At later times, e.g. $t_2$, $t_3$, $t_4$, etc., the beam points in different directions as the scan mirror rotates. Scan mirror 1315 may be mounted on a galvo scanning unit or may be part of a spinning polygon mirror, as examples. In FIG. 13, scan mirror rotates around an axis (not shown) perpendicular to the page. This motion leads to reflected laser beams lying on one plane coincident with the page. In general, however, a scan mirror may also rotate around other axes and thereby produce laser beam directions not all in one plane.

Laser 1310 may be modulated such that it emits light only at discrete times. For example, if scan mirror 1315 rotates a constant speed, but laser 1310 emits light only at discrete times, e.g. $t_1$, $t_2$, $t_3$, $t_4$, etc., then laser spots created on wall of an indoor space by projector 1305 will appear in rapid succession, but not simultaneously. Successive spots may still be used for navigation by space resection depending on relative time scales of relevant events. If a set of spots is projected within the time that a camera (e.g. camera 130) captures one image frame, then the camera cannot distinguish the temporal sequence of the spots; as far as the camera is concerned, the spots appear simultaneously.

For best navigation accuracy, new complete sets of spots should appear faster than the time it takes for a tracked object to move appreciably. Further, spots should appear long enough for cameras to gather enough light to make accurate estimates of spot location in images. The signal to noise ratio of spot detection may be improved by modulating a laser beam.

Figure 14:
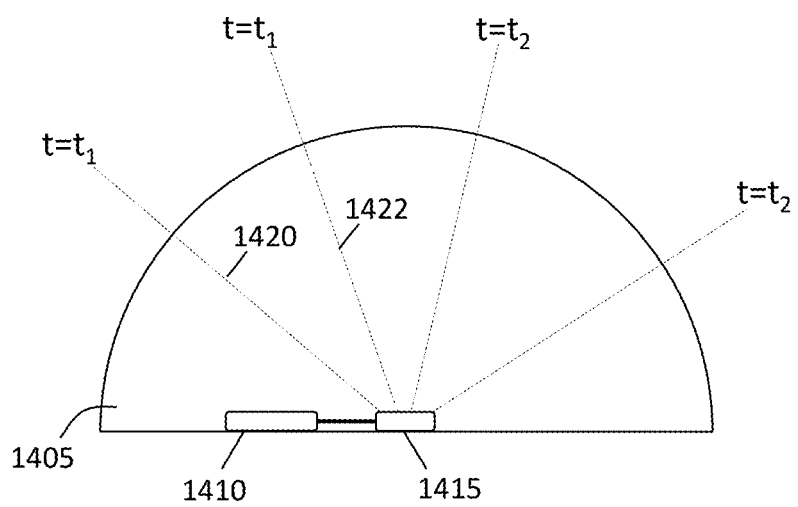
FIG. 14 illustrates a multi-beam laser projector based on laser beam modulated by a spatial light modulator.

FIG. 14 illustrates a multi-beam laser projector based on laser beam modulated by a spatial light modulator. In FIG. 14, laser projector 1405 includes laser 1410 and spatial light modulator (SLM) 1415. SLM 1415 transforms a beam of light from laser 1410 into a projected image. The image may contain a single spot of light or it may include many spots. As an example, in FIG. 14, SLM 1415 modulates a laser beam from laser 1410 into beams 1420 and 1422 which appear simultaneously at time $t=t_1$. Spatial light modulator 1415 may be based on a micro-electromechanical (MEMS) mirror array such as Texas Instruments' Digital Mirror Device or a MEMS ribbon array such as a grating light modulator.

A spatial light modulator may be used to create a set of numerous spots that covers a large solid angle. Alternatively an SLM may be used to create successive sets of just one, two or a few spots. The latter approach may allow each spot to be brighter depending on the SLM technology used.

A projector based on a MEMS SLM need not move (on a macroscopic scale) with respect to a tracked object to which it is attached. Thus, instead of sending Euler angle data to a space resection processor, a projector may send a set of reference unit vector coordinates analogous to unit vectors $p_1$, $p_2$ and $p_3$ shown in FIG. 6B. In fact, any of the advanced laser projectors described above may take this approach. It is a matter of engineering choice whether to supply a rotation matrix to relate projector and object coordinates or to recalculate the unit vector coordinates in the object coordinate system at any given time.

Gimbal mounts, spinning mirrors and MEMS based SLMs all introduce the possibility that sets of spots are projected in different directions from an object at different times. A navigation solution based on space resection is valid for spots observed during a short time interval $\Delta t$. At later times different sets of spots may be used and the space resection problem may need to be solved again even if a tracked object has not moved. Considering the time dependence of laser beam directions, FIG. 15 is a flow chart for an indoor navigation method.

Figure 15:
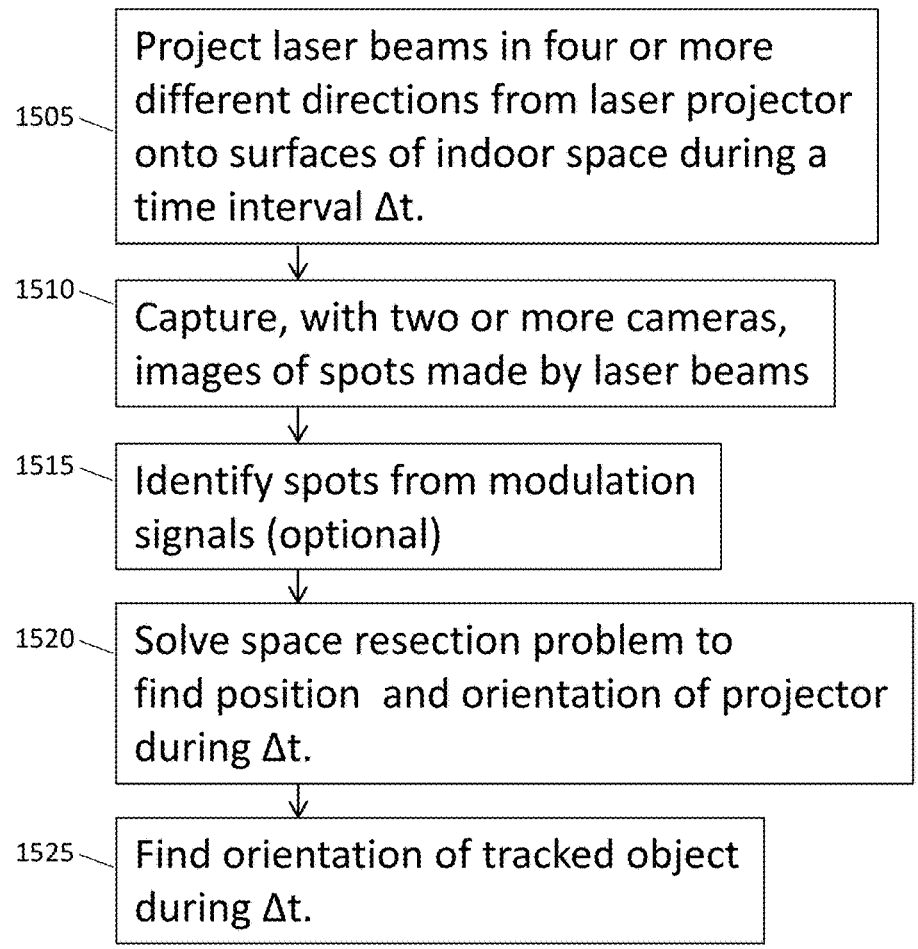
FIG. 15 is a flow chart for an indoor navigation method.

According to FIG. 15, the first step 1505 in the method is to project laser beams in four or more different directions from a laser projector onto surfaces of an indoor space during a time interval Δt. Next, in step 1510, images of the spots made by the beams are captured with two or more cameras. At least two cameras are necessary to determine the three dimensional position of the laser spots in the coordinate system of the indoor space. Ideally images are captured by each camera at the same time. Delay between images may reduce the accuracy of the system depending on the speed of a tracked object. Cameras may provide a timestamp along with the two dimensional coordinates of observed laser spots so that a processor can use sets of spots observed as close to simultaneously as possible.

The next step 1515 is to identify the observed points based on unique modulation signals applied to each laser beam. This step is not required if no laser modulation is used. Given the observed location of laser spots as determined from data supplied by two or more cameras and knowledge of the geometry of the laser projector, the space resection problem is now solved in step 1520. The solution may proceed in analogy to the example provided above or it may use another method. The solution may include resolving geometric ambiguities which may arise. Finally in step 1525, if the relative orientation of the projector and a tracked object is known that information may be used to find the orientation of a tracked object. That orientation may only be constant during Δt. Thus new projector—object relative orientation information may be needed at later times.

CONCLUSION

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. An indoor navigation system comprising:
    a tracked object;
    a laser projector attached to the tracked object, the laser projector configured to emit four or more laser beams at discrete times successively relative to each other in four or more different directions during a first time interval, the four or more laser beams forming four or more spots on one or more surfaces of an indoor space, wherein the laser projector is configured to transmit an orientation of the laser projector relative to the tracked object;
    two or more cameras configured to capture images of the four or more spots formed by the four or more laser beams during the first time interval, the first time interval being less than a frame time of the two or more cameras; and
    a processor in communication with the two or more cameras, the processor configured to:
        receive the orientation of the laser projector relative to the tracked object;
        estimate three-dimensional locations of the four or more spots from the images captured by at least two of the two or more cameras based on a calibration of the two or more cameras;
        estimate a position and orientation of the laser projector in the indoor space by space resection using predetermined angles between each pair of laser beams of the four or more laser beams and the three-dimensional locations of the four or more spots, a respective predetermined angle between each pair of laser beams being different from that between any other pair of laser beams, the space resection including:
            creating a virtual point not coplanar with three spots of the four or more spots;
            using correspondences between the three-dimensional locations of the three spots and the virtual point expressed with respect to the indoor space and the laser projector to establish a transformation matrix between a world coordinate system associated with the indoor space and a reference coordinate system associated with the laser projector; and
            using the transformation matrix to test a fourth spot of the four or more spots to resolve geometric ambiguities in the space resection, the fourth spot tested by transforming the fourth spot into the reference coordinate system using the transformation matrix, projecting it onto a unit sphere, and comparing the fourth spot to a corresponding reference unit vector;
        estimate an orientation of the tracked object in the indoor space using the position and orientation of the laser projector in the indoor space and the orientation of the laser projector relative to the tracked object.

2. The system of claim 1, wherein the projector is attached to the tracked object via a gimbal mount.

3. The system of claim 1, wherein the laser projector comprises a rotating mirror; and the processor is in communication with the laser projector to determine an angle of the rotating mirror during the first time interval.

4. The system of claim 1, wherein the laser projector comprises a micro-electromechanical (MEMS) spatial light modulator; and the processor is in communication with the laser projector to determine unit vectors representing directions of laser beams emitted by the projector during the first time interval.

5. The system of claim 1, wherein the four or more different directions coincide at a point.

6. The system of claim 1, wherein the laser beams have an infrared wavelength and the cameras are equipped with infrared filters to select the wavelength in preference to background light.

7. The system of claim 1, wherein each laser beam is modulated with a modulation signal that distinguishes it from all of the other laser beams, and each camera demodulates the signal to identify a correspondence between spots and laser beam directions.

8. The system of claim 7, wherein the modulation signal is sinusoidal.

9. The system of claim 7, wherein the modulation signal is a pseudorandom code.

10. The system of claim 7, wherein the modulation signal carries information pertaining to an orientation of each laser beam with respect to the tracked object.

11. A method for indoor navigation, the method comprising:
    emitting, using a laser projector coupled to a tracked object, four or more laser beams at discrete times successively relative to each other in four or more different directions during a first time interval, the four or more laser beams forming four or more spots on one or more surfaces of an indoor space;

transmitting an orientation of the laser projector relative to the tracked object;

capturing, using two or more cameras, images of the four or more spots formed by the four or more laser beams during the first time interval, the first time interval being less than a frame time of the two or more cameras;

estimating three-dimensional locations of the four or more spots from the images captured by at least two of the two or more cameras based on a calibration of the two or more cameras;

estimating a position and orientation of the laser projector in the indoor space by space resection using predetermined angles between each pair of laser beams of the four or more laser beams and the three-dimensional locations of the four or more spots, a respective predetermined angle between each pair of laser beams being different from that between any other pair of laser beams, the space resection including:

creating a virtual point not coplanar with three spots of the four or more spots;

using correspondences between the three-dimensional locations of the three spots and the virtual point expressed with respect to the indoor space and the laser projector to establish a transformation matrix between a world coordinate system associated with the indoor space and a reference coordinate system associated with the laser projector; and using the transformation matrix to test a fourth spot of the four or more spots to resolve geometric ambiguities in the space resection, the fourth spot tested by transforming the fourth spot into the reference coordinate system using the transformation matrix, projecting it onto a unit sphere, and comparing the fourth spot to a corresponding reference unit vector;

estimating an orientation of the tracked object in the indoor space using the position and orientation of the laser projector in the indoor space and the orientation of the laser projector relative to the tracked object.

12. The method of claim 11, wherein the projector is attached to the tracked object via a gimbal mount.

13. The method of claim 11, wherein the laser projector comprises a rotating mirror; and the method further comprising: estimating an orientation of the tracked object during the first time interval, given an angle of the rotating mirror with respect to the object during the first time interval.

14. The method of claim 11, wherein the laser projector comprises a micro-electromechanical (MEMS) spatial light modulator; and the method further comprising: estimating an orientation of the tracked object during the first time interval, given a set of unit vector coordinates describing directions of the four or more laser beams emitted by the projector with respect to the tracked object during the first time interval.

15. The method of claim 11, wherein the two or more cameras are calibrated by:

capturing simultaneously, using the two or more cameras, images of four or more spots on a planar surface;

determining homographies between each pair of cameras of the two or more cameras by identifying corresponding spots in the captured images;

determining from the homographies: relative poses between each pair of cameras and an orientation of the planar surface with respect to the pair of cameras;

fitting the orientation of the planar surface to a model of the indoor space; and determining a location and a pose of each of the two or more cameras in the indoor space.

16. The method of claim 11, wherein each laser beam is modulated with a modulation signal that distinguishes it from all of the other laser beams, and each camera demodulates the signal to identify a correspondence between spots and laser beam directions.

17. The method of claim 16, wherein the modulation signal is sinusoidal.

18. The method of claim 16, wherein the modulation signal is a pseudorandom code.

19. The method of claim 11, wherein the four or more different directions coincide at a point.

20. The method of claim 11, wherein the laser beams have an infrared wavelength and the cameras are equipped with infrared filters to select the wavelength in preference to background light.

21. A method for indoor navigation, the method comprising:

emitting, using a laser projector coupled to a tracked object, a first set of four or more laser beams at discrete times successively relative to each other in a first set of four or more different directions during a first time interval, the first set of four or more laser beams forming a first set of four or more spots on one or more surfaces of an indoor space;

transmitting a first orientation of the laser projector relative to the tracked object;

emitting, using the laser projector, a second set of four or more laser beams at discrete times successively relative to each other in a second set of four or more different directions during a second time interval after the first time interval, the second set of four or more laser beams forming a second set of four or more spots on one or more surfaces of the indoor space;

transmitting a second orientation of the laser projector relative to the tracked object;

capturing, using two or more cameras, images of the first set of four or more spots formed by the first set of four or more laser beams and the second set of four or more spots formed by the second set of four or more laser beams during a combined time interval including the first time interval and the second time interval, the combined time interval being less than a frame time of the two or more cameras;

estimating three-dimensional locations of the first set of four or more spots and the second set of four or more spots from the images captured by at least two of the two or more cameras based on a calibration of the two or more cameras;

estimating a position and attitude of the laser projector in the indoor space during the combined time interval by space resection using predetermined angles between each pair of laser beams of the first set of four or more laser beams and the second set of four or more laser beams and the three-dimensional locations of the first set of four or more spots and the second set of four or more spots, the space resection including:

creating a virtual point not coplanar with three spots of the first set of four or more spots and the second set of four or more spots;

using correspondences between the three-dimensional locations of the three spots and the virtual point expressed with respect to the indoor space and the laser projector to establish a transformation matrix between a world coordinate system associated with the indoor space and a reference coordinate system associated with the laser projector; and using the transformation matrix to test a fourth spot of the first set of four or more spots and the second set of four or more spots to resolve geometric ambiguities in the space resection, the fourth spot tested by transforming the fourth spot into the reference coordinate system using the transformation matrix, projecting it onto a unit sphere, and comparing the fourth spot to a corresponding reference unit vector;

estimating an orientation of the tracked object in the indoor space using the position and orientation of the laser projector in the indoor space and the first orientation and the second orientation of the laser projector relative to the tracked object.

22. The method of claim 21, wherein the laser projector is attached to the tracked object via a gimbal mount.

23. The method of claim 21, wherein the laser projector comprises a rotating mirror; and the method further comprising: estimating an orientation of the tracked object during the combined time interval, given angles of the rotating mirror with respect to the tracked object during the combined time interval.

24. The method of claim 21, wherein the laser projector comprises a micro-electromechanical (MEMS) spatial light modulator; and the method further comprising: estimating an orientation of the tracked object during the combined time interval, given a set of unit vector coordinates describing directions of the first set of four or more laser beams and the second set of four or more laser beams emitted by the projector with respect to the tracked object during the combined time interval.

25. The method of claim 21, wherein the two or more cameras are calibrated by:

capturing simultaneously, using the two or more cameras, images of four or more spots on a planar surface;

determining homographies between each pair of cameras of the two or more cameras by identifying corresponding spots in the captured images;

determining from the homographies: relative poses between each pair of cameras and an orientation of the planar surface with respect to the pair of cameras;

fitting the orientation of the planar surface to a model of the indoor space; and determining a location and a pose of each of the two or more cameras in the indoor space.

26. The method of claim 21, wherein each laser beam is modulated with a modulation signal that distinguishes it from all of the other laser beams, and each camera demodulates the signal to identify a correspondence between spots and laser beam directions.

27. The method of claim 26, wherein the modulation signal is sinusoidal.

28. The method of claim 26, wherein the modulation signal is a pseudorandom code.

29. The method of claim 21, wherein an angle between each pair of laser beams of the first set of four or more laser beams is different from that of any other pair of laser beams of the first set of four or more laser beams, and an angle between each pair of laser beams of the second set of four or more laser beams is different from that of any other pair of laser beams of the second set of four or more laser beams.

30. The method of claim 21, wherein the first set of four or more laser beams coincide at a first point, and the second set of four or more laser beams coincide at a second point.

31. The method of claim 21, wherein the laser beams have an infrared wavelength and the cameras are equipped with infrared filters to select the wavelength in preference to background light.

32. The system of claim 1, wherein no more than two laser beams of the four or more laser beams are coplanar with respect to each other.

33. The method of claim 11, wherein no more than two laser beams of the four or more laser beams are coplanar with respect to each other.

* * * * *